(12) United States Patent
Kerr

(10) Patent No.: US 8,469,663 B2
(45) Date of Patent: Jun. 25, 2013

(54) TRANSFER OF KINETIC ENERGY TO AND FROM FLUIDS

(75) Inventor: Colin C. Kerr, Dartmouth (CA)

(73) Assignee: ResHydro LLC, New York, NY (US)

( * ) Notice: Subject to any disclaimer, the term of this patent is extended or adjusted under 35 U.S.C. 154(b) by 1224 days.

(21) Appl. No.: 11/921,469

(22) PCT Filed: Jun. 1, 2006

(86) PCT No.: PCT/US2006/021157
§ 371 (c)(1),
(2), (4) Date: Dec. 3, 2007

(87) PCT Pub. No.: WO2006/130719
PCT Pub. Date: Dec. 7, 2006

(65) Prior Publication Data
US 2010/0143115 A1    Jun. 10, 2010

Related U.S. Application Data

(60) Provisional application No. 60/685,891, filed on Jun. 1, 2005.

(51) Int. Cl.
*F03D 5/06* (2006.01)

(52) U.S. Cl.
USPC ........ 416/1; 416/64; 416/66; 416/68; 416/79; 416/80; 416/81; 416/82; 416/83; 416/132 R; 416/236 R; 416/237; 416/240

(58) Field of Classification Search
USPC ............. 416/1, 64–69, 79–83, 236 R, 236 A, 416/237, 132 R, 240; 60/497–498, 500, 505–506; 290/53, 54, 55
See application file for complete search history.

(56) References Cited

U.S. PATENT DOCUMENTS

| | | | | | |
|---|---|---|---|---|---|
| 3,040,976 | A | * | 6/1962 | De Mattos | 416/66 |
| 3,995,972 | A | * | 12/1976 | Nassar | 416/68 |
| 4,024,409 | A | * | 5/1977 | Payne | 290/55 |
| 4,170,738 | A | * | 10/1979 | Smith | 290/53 |
| 4,184,805 | A | * | 1/1980 | Arnold | 416/1 |
| 4,255,085 | A | * | 3/1981 | Evans | 416/236 R |
| 4,362,469 | A | * | 12/1982 | van Holten | 416/191 |
| 6,273,680 | B1 | * | 8/2001 | Arnold | 416/1 |
| 6,877,692 | B2 | * | 4/2005 | Liu | 416/83 |

* cited by examiner

*Primary Examiner* — Christopher Verdier
(74) *Attorney, Agent, or Firm* — William H. Holt; Michael Mauriel

(57) ABSTRACT

Method and apparatus for converting the kinetic energy of a moving fluid stream into useful work by using a parallel cascade of aerofoils or hydrofoils positioned therein. The foils may be provided with at least two degrees of freedom and adjacent foils move in antiphase. The foils are subjected to resonant oscillations, known as flutter, induced by the fluid flow. Profiled inflow and outflow ducts may be positioned upstream and downstream, and the apparatus may be enclosed in a profiled duct, to increase efficiency by altering the fluid velocity and pressure. The foils are cantilevered, supported by vertical rods but are otherwise unattached. A cascade comprised of independent foil modules, each including a foil, a power conversion module and a motion control module, may be programmed to (1) receive energy from a fluid stream to generate power, or (2) transfer energy into a fluid stream to create propulsion or pumping.

23 Claims, 8 Drawing Sheets

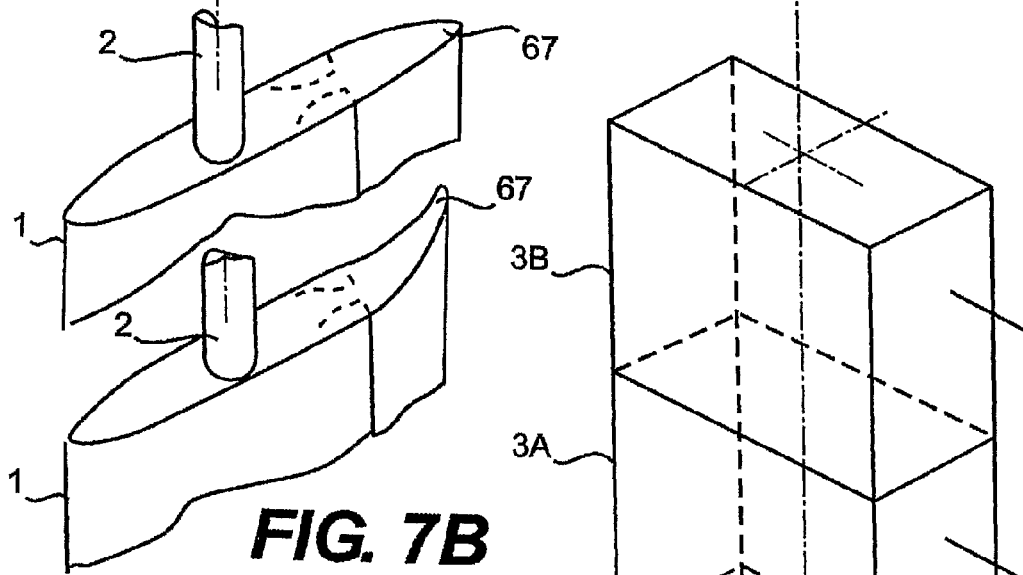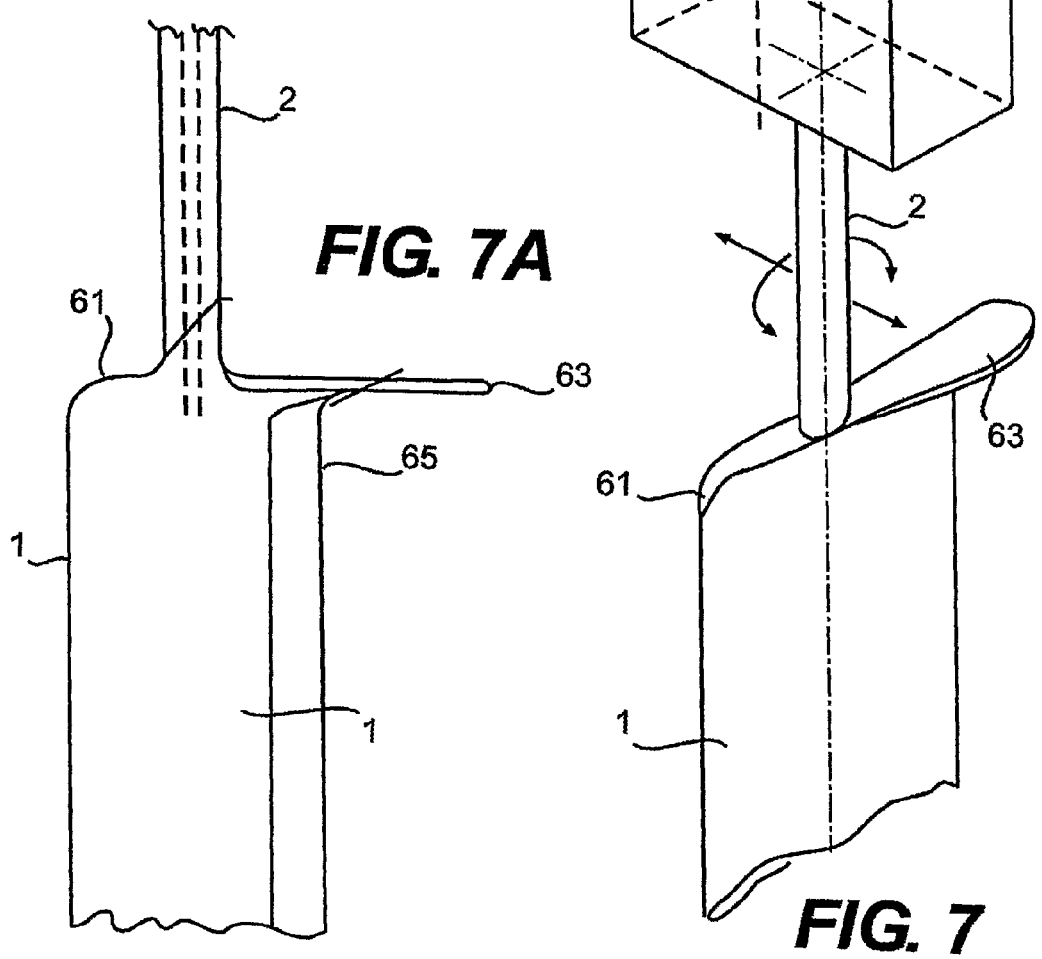

TRANSFER OF KINETIC ENERGY TO AND FROM FLUIDS

This application claims the benefit of U.S. Provisional Application 60/685,891 filed 1 Jun. 2005.

BACKGROUND OF THE INVENTION

This invention comprises improvements to the methods and apparatus disclosed in Dr. Lee Arnold's U.S. Pat. No. 4,184,805 (January 1980), U.S. Pat. No. 4,347,036 (August 1982), and U.S. Pat. No. 6,273,680 (August 2001).

FIELD OF THE INVENTION

The present invention relates to techniques and apparatus for using the kinetic energy contained in a moving fluid stream to produce useful power, and more particularly to a cascade of foils held in the moving fluid only by cantilevered suspension bars. The cascade of foils, moving in antiphase, can be arranged to extract energy from the fluid, for power generation, making use of the phenomenon of flutter, requiring two or more degrees of freedom, or by driving the foils from an external power source to inject energy into the fluid for creating propulsion or pumping, making use of externally programmed oscillation, also with two or more degrees of freedom.

DESCRIPTION OF THE PRIOR ART

Renewable resources, which centuries ago were human society's principal sources of power, include solar, wind and water power, wave and tidal power. All renewable resources are derived from solar energy except tidal power, which is derived from lunar gravitational attraction, (geothermal energy, which is derived from heat stored in the earth's core is not, strictly speaking, a renewable resource). Active and passive solar power, wind, water, wave and ocean current energy all result from terrestrial weather cycles, which in turn are ultimately all caused by solar radiation.

The search for efficient means to convert renewable energy resources to useful work includes mechanical wind turbines, converting the kinetic energy of wind to mechanical energy, using lift or drag forces, and mechanical water turbines, converting the kinetic energy of flowing water, or the potential energy of elevated stored water, to mechanical energy. In most cases the energy thus converted is transformed into electrical power for final distribution and use.

U.S. Pat. No. 1,486,040 (Schieferstein) discloses a means of propulsion using a mechanically driven oscillatory vane, but with only a single degree of freedom.

U.S. Pat. No. 2,783,022 (Salzer) describes an ocean wave power conversion device comprising a series of floats rotating a horizontal shaft through up-and-down motions. This device does not employ oscillating foils.

U.S. Pat. No. 3,040,976 (de Mattos) discloses a means of air propulsion using a parallel grouping of mechanically driven oscillatory vanes, again with only a single degree of freedom.

U.S. Pat. No. 3,508,840 (Lederlin) discloses an airfoil or series of flapping airfoils with curvature shaped to recirculate self-generated vortices. Such airfoil or airfoils are not operated in flutter or in antiphase.

U.S. Pat. No. 3,783,858 (Ashikian) discloses a means of heating a liquid using resonant oscillations in a column of air. This invention does not convert fluid to mechanical energy using foils in antiphase flutter.

U.S. Pat. No. 3,883,750 (Uzell) describes a venturi-enclosed horizontal axis rotating propeller-type wind turbine.

U.S. Pat. No. 3,995,972 (Nassar) discloses an oscillating-type wind power converter in which one or several airfoils are caused to reciprocate using a pitch-altering device that reverses the airfoil pitch angle at the end of each excursion. This device does not employ flutter in two or more degrees of freedom, and the stack of airfoils described does not operate in antiphase.

U.S. Pat. No. 4,024,409 (Payne) discloses an oscillating fluid power conversion device making use of the resonant reaction of a wire, long cylinder or airfoil subjected to incident wind such that vortices are generated by one surface, causing a force to be exerted on that surface, which moves away from its rest position, creating a new vortex on the opposite surface. This new vortex causes an opposite force to be exerted on the body, resulting in resonant oscillation from which energy may be extracted, as a damping force. In this invention, using its airfoil embodiment, the airfoil oscillates in one degree of freedom in reaction to vortex shedding, not in flutter.

U.S. Pat. No. 4,170,738 (Smith) discloses a drag-operated device (panemone) to extract energy from undersea water motion, transferring that motion via a reciprocating rack and pinion means to a bidirectional generator. This device does not employ foils, flutter, or antiphase motion.

U.S. Pat. No. 4,184,805 (Arnold) is the first basic patent describing the antiphase motion in flutter of a cascade of foils, in air or water. The present invention constitutes a fundamental improvement to the Arnold patent in which all mechanisms and linkages attached to each foil have been replaced by a single cantilevered suspension bar coupled to a modular power delivery and motion control system.

U.S. Pat. No. 4,347,036 (Arnold) is a division of the same original application, and describes the same device, as U.S. Pat. No. 4,184,805.

U.S. Pat. No. 5,457,346 (Blumberg) describes a horizontal-axis propeller-type wind turbine similar to U.S. Pat. No. 3,883,750 above, in which a venturi concentrates incident wind onto the turbine rotor. This device does not use foils, the flutter phenomenon, or a cascade of foils in antiphase motion.

U.S. Pat. No. 6,273,680 (Arnold) continues to develop the original mechanical embodiment of the oscillating cascade power system as first disclosed in U.S. Pat. No. 4,184,805, with some additional material concerning inertial mass adjustment and inflow concentration with flat barriers.

The considerable literature on aeroelasticity generally treats flutter as a highly destructive force which, allowed to occur in an airfoil, inevitably leads to its disintegration. The Arnold patents cited above show how flutter can in principle be used to extract useful energy from a flowing fluid. The present invention, based on and improving on the Arnold patents, makes the commercial application of the fluttering antiphase cascade power converter possible by eliminating the multiplicity of oscillating mechanical parts, linkages, bearings, rods, shafts and gears described in those earlier patents.

While the analytical treatment of flutter applies to all fluids, flutter in air is well known but flutter in water had not been extensively studied or observed. The Dr. Arnold patents are the first to describe the means to initiate and sustain flutter in water.

SUMMARY OF THE INVENTION

The invention contains design features of a durable and efficient embodiment of an Oscillating Cascade Power System (OOPS) and includes a plurality of cantilevered foils which are oscillated and caused to flutter by kinetic energy extracted from a moving fluid such as wind, or from water moving in a stream, river, ocean current, tide, or directed flow. A power generator system includes a novel modular power and control module which is driven by the flutter of the plurality of foils.

The use of cantilevered foils eliminates the need for the considerable amount of physical mechanism attached to the prior art foils described in U.S. Pat. Nos. 4,184,805, 4,347, 036 and 6,273,680. The foils are controllable by a programmable control servosystem using a working fluid or electricity. The control program may consist of an algorithm based on the equations of motion of foils acting in antiphase flutter mode.

Further, the present apparatus provides for efficiently harnessing large amounts of the available kinetic energy from a moving fluid stream using a parallel cascade of cantilevered foils, without using extensive attached mechanism. The general term "foil" us used herein includes the concept of a "hydrofoil", as used in flowing water and an "aerofoil", as used in wind energy conversion, or "paddle" as used in propulsion. The term "airfoil", which refers more specifically to fixed or rotating wings used to create lift for aircraft, does not apply in the context of this invention.

An aspect of the invention is to provide, in a cascade of foils in a moving fluid stream, acting in antiphase, an independent modular foil, power and control apparatus such that individual foils can be inserted or removed from the cascade, even while the cascade is in operation, without touching or affecting the adjacent foils.

For flutter, i.e., resonant oscillation with two or more degrees of freedom to occur in foils, the effective inertial mass of the foils and the existence of stroke-end restoring forces are critical. An aspect of this invention is to provide a novel means of adjusting and controlling the inertial mass and restoring force instantaneously while the system is in operation, allowing the performance of the system to be continuous and automatic in the course of changing flow and load conditions.

In the rest position, the foils are at a zero angle of attack. No oscillation occurs even though the foils are immersed in a moving fluid stream. In the prior art, it was necessary to physically "disturb" the foils to start the mechanism and initiate flutter. An aspect of this invention is a means for remotely starting the oscillations without manual intervention. Furthermore, in the prior art, no means was provided to stop the fluttering foils other than by interrupting the fluid flow, or by overcoming the oscillations through stalling the mechanism by applying extreme loading. Another aspect of this invention is a means for instantly stopping one or all of the oscillating foils by causing them to adopt a zero angle of attack, thus cutting off the power output while the fluid stream is still flowing, and without undue stress or damage to the foils or associated mechanism.

Another aspect of the invention is to provide a dual-purpose support structure to which a plurality of independent foil modules are secured, which also carries the power and control manifolds used to connect the foil modules to the central controller. The manifolds are equipped with a series of multichannel shutoff valves and receptacles, such that multichannel connectors on individual foil modules can readily be connected or removed.

A further aspect of the invention is through electronic monitoring of all internal and external system parameters, including fluid velocity and load, by processing these data in a programmable logic control device governed by a special control algorithm, the resulting continuous adjustment of inertial mass and restoring forces not only optimizes system performance at all times, but also extends the operating envelope of the system by lowering the critical fluid speed for initiation of flutter, and raising the maximum, or shutdown, speed at which the system can be safely operated. In the prior art, such improvements could not be implemented because the oscillating cascade and its control system is entirely mechanical in nature and must first be shut down to effect any adjustments in inertial mass or restoring force.

An aspect of the invention relative to the propulsion or pumping mode of the cascade of foils is, by virtue of the independently and externally controllable foil modules, to impart a variety of differently programmed sequential or simultaneous motions to the individual foils in two degrees of freedom to optimize the propulsion or pumping action. For example, the cascade can be programmed to reproduce a progressive swimming action along the cascade that would have been impossible according to the prior art.

Another aspect of the invention relative to propulsion is that a single foil can be programmed to act alone in a propulsion or pumping mode, and if that foil is a member of a cascade, the other members of the cascade can be docked in transverse positions to block other fluid flow to assist in river or flood control.

The important features of the invention, and its significant distinction from prior art, specifically including the three patents of Dr. Lee Arnold, have thus been broadly outlined, in order that the detailed description thereof which follows may be better understood, and in order that the present contribution to the art may be better appreciated. Additional features of the invention will be described hereinafter, which will form the subject of the claims appended hereto. Those skilled in the art will appreciate that this invention may be utilized as a basis for designing other means for carrying out the several purposes of this invention. It is therefore important that the claims of this invention be regarded as including such equivalent constructions and methods as do not depart from the overall scope of the invention.

BRIEF DESCRIPTION OF THE DRAWINGS

FIG. 7 is a perspective view of a foil module, showing details of foil design for reducing generation of vortices.

FIG. 7A is a side view of a portion of a foil.

FIGS. 7B and 7C are fragmentary portions of the trailing edge of a foil showing a comparison of a flexible boot along the trailing edge.

DETAILED DESCRIPTION OF THE PREFERRED EMBODIMENTS

Figure 1:
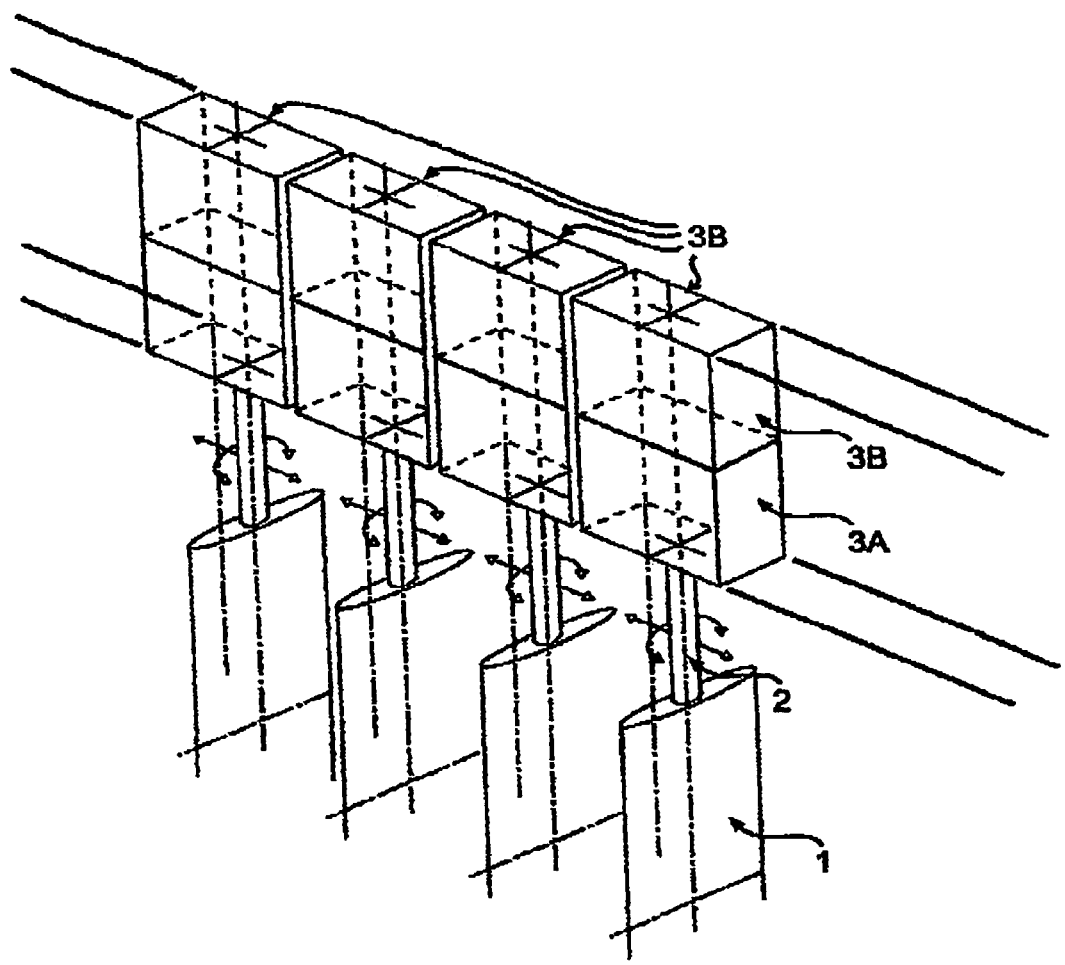
FIG. 1 is a perspective view of a cascade of separate foil modules, which can be oriented at any angle, mounted on a rigid support structure 4. Each foil module is comprised of a foil 1, a suspension bar 2, a power conversion module 3A and a control module 3B.

FIG. 1 shows four vertical foils 1 each suspended by, and only by, a suspension bar 2 of circular cross-section. The bars 2 project from the bottom of series of independent but identical sets of stationary power/control module assemblies 3. Any even number of power/control modules 3 are mounted on a rigid system support structure 4. The weight of each foil 1 is borne by its power/control module 3. Each of the power/control module sets 3 is comprised of a power module 3A and a control module 3B. The suspension bars 2 are held rigidly vertical and parallel by virtue of passing through two vertical, coaxial bearings carried by the power modules 3A and/or the control modules 3B. The foils 1 may themselves be entirely submerged, and have no mechanical connections to anything other than suspension bars 2. Bars 2 are free to move translationally (side-to-side) within a limited range, and are free to rotate about a vertical axis, also within a limited range, but are restrained from moving in a flow-wise (front to back) direction or from rotating (swinging) translationally. Accordingly, the foils 1 are all cantilevered to remain rigidly vertical at all times but are capable of moving rotationally and translationally for limited distances. In particular, foils 1 cannot move (or swing) in a downstream direction as a result of fluid drag forces.

The range of translational and vertical rotational foil motion permitted by this arrangement is resolvable into any position or combination of foil pitch and translation required to initiate and sustain flutter in a cascade. Adjacent foils 1 are constrained to precisely antiphase motion by the control modules 3B, in both lateral and rotational motion (pitch), to fulfill the necessary conditions for flutter in a cascade. Power output from each foil 1 is transferred by a respective power module 3A, acting only on lateral foil motion during the power stroke segment of the foil motion waveform. Connections to the power/control modules 3 are via pressurized fluid transfer (hydraulic or pneumatic), or by electrical means. It is a designed feature of the power/control module assemblies that a single assembly can be removed from an operating, power generation system and replaced without stopping or otherwise affecting the operation of the remaining assemblies.

Figure 2:
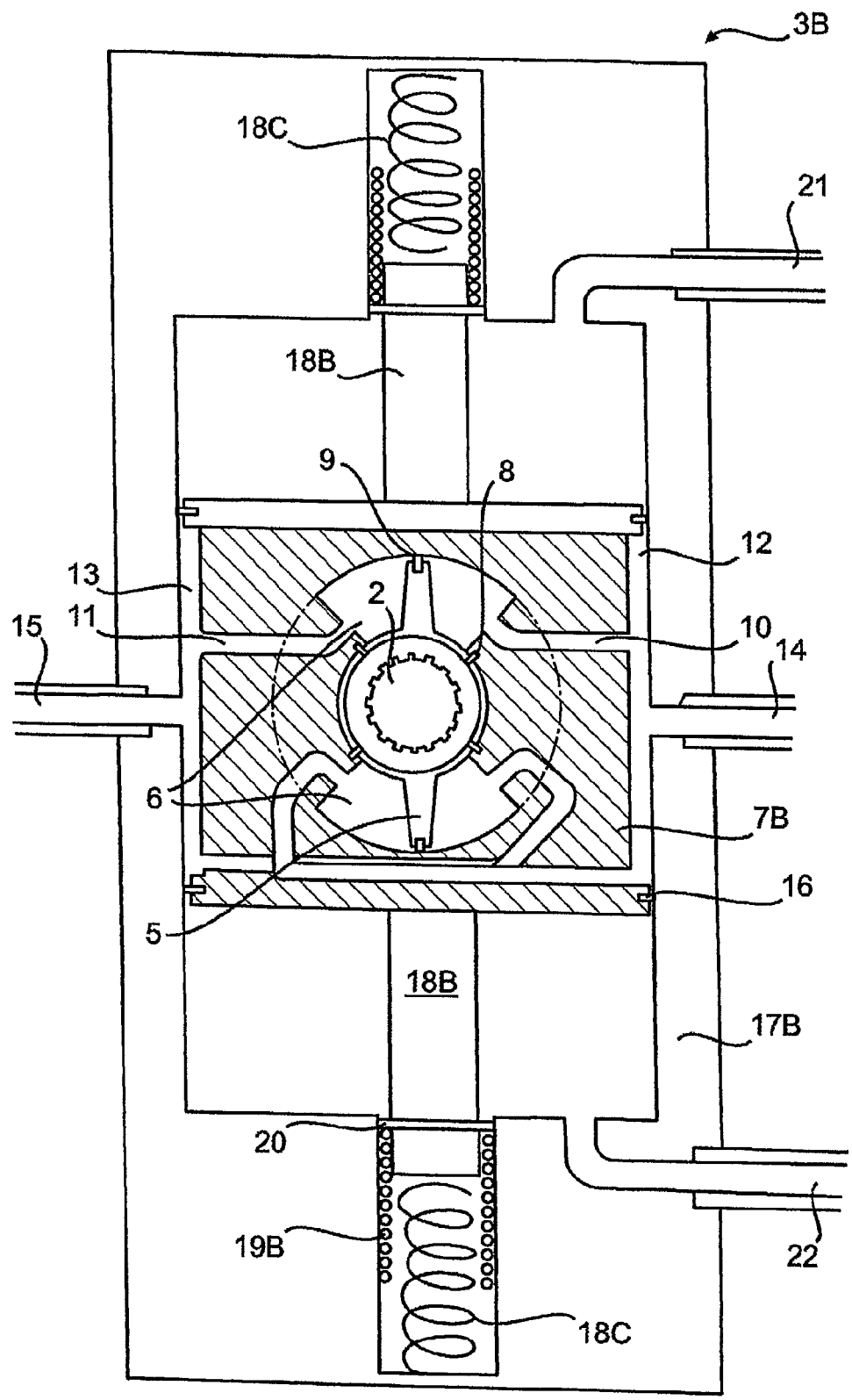
FIG. 2 is a plan view, partly in section, of a control module, showing the foil suspension bar 2 splined into a rotational impeller 5 moving within a rotation chamber 6, all contained within a translational piston 7B moving within a cylinder 17B. External orifices 14, 15, 21 and 22 conduct the working fluid to and from the control module.

As shown in FIG. 2, a control module 3B provides a means for simultaneously inducing lateral motion (translation) and independent rotary motion into each foil 1. Analytically, this combination of independent angular and z-axis motion can be resolved into any possible foil motion or position required to initiate or sustain flutter, in particular, (a) the independent phasing of leading and trailing edge oscillation, and (b) the imposition of the external differential leading and trailing edge restoring forces and inertial masses required to initiate and sustain flutter. Additionally, in combination with the attached power module 3A, this mechanical design provides (c) flow-wise, x-axis stiffness of the foil cascade (drag restraint), and (d) strict parallelism of all suspension bars 2 in all conditions of operation. Finally, each control/power module assembly 3 provides vertical support of foils 1 without any interaction with any of the operating axes of the cascade—translational or rotational. The upper end of the foil suspension bar 2 passes through both the power and control modules, and is splined where it passes through the control module 3B to permit transfer of rotational force (torque). The vertical suspension bar 2 can be supported by two bearings, one located at the top and one at the bottom of the control module assembly 3B, at least one of which is a thrust bearing. Accordingly, while the control module 3B itself remains stationary, each foil suspension bar 2 can independently rotate about a vertical axis within the module, to a degree limited by the radial space within the rotation chamber 6.

Rotation: In control module 3B, the splined foil suspension bar 2 passes through a correspondingly splined rotational impeller 5. Impeller 5 can rotate about a vertical axis inside the rotational chamber 6 located within a translational piston 7B. Rotation of impeller 5 is limited by design to about 40 degrees by the radial shape of chamber 6. The center surface of impeller 5 is kept from contacting the inner chamber wall by a small clearance, and is sealed vertically by internal and external "piston-ring" type seals 8 and 9. The top and bottom ends of impeller 5 are equipped with similar seals (not shown in this central cross-section), such that the interiors of the chamber segments can be subjected to fluid pressures. Fluid conduit channels 10 and 11 extend between the rotation chambers 6 and longitudinal peripheral recesses 12 and 13 respectively, in the translational piston 7B, leading to external orifices 14 and 15 leading out of control module 3B. Fluid pressure applied to orifice 14 therefore results in a corresponding negative (counterclockwise) rotation of the rotational impeller 5. Similarly, fluid pressure applied to orifice 15 results in rotation of impeller 5 in a positive direction. Piston rings 16 at both ends of the translational piston 7B ensure that fluid pressures applied to the orifices 14 and 15 efficiently cause rotation of impeller 5 inside piston 7B, while piston 7B is in independent translational motion, within its prescribed limits of longitudinal travel. In summary, regardless of the position or motion of piston 7B, the rotational impeller 5 will impart precisely controllable torque (rotational motion) to bar 2 and foil 1, as the result of externally applied fluid pressures, without any moving parts, hoses or moving connections.

Translation: The translational piston 7B can move longitudinally inside the cylinder 17B with small clearance from actual contact with the cylinder wall, but sealed by the same piston rings 16 that also function to seal the fluids acting on the rotational impeller 5. Projecting from both ends of the piston 7B are substantial round piston support rods 18B, which are carried by linear bearings 19A and 19B, typically of the recirculating ball type, mounted in each end of the cylinder 17B. The lengths of these piston support rods 18B and the depth of the corresponding bores into the cylinder ends are governed by the intended translational travel of the piston 7B. Additionally, piston ring type shaft seals 20 ensure that fluid pressures applied to orifices 21 or 22 in the cylinder 17B efficiently induce piston 7B to move longitudinally in either direction, again without requiring any moving parts, hoses or moving connections to the manifolds.

In summary, by the above means, and regardless of their instantaneous translational and rotational positions, all foils 1 in the cascade can be locked into precise antiphase motion.

Foil Parallelism: By virtue of the foil suspension bar 2 passing through both the control and power module pistons 7B and 7A, but constrained from all but rotational motion by the upper and lower bearings, and by virtue of the two horizontal sets of piston support rods 18B and 18A running in linear bearings 19B and 19A, constrained from any angular z-axis motion (horizontal swinging), it is apparent that all the foils 1 attached to the suspension bars 2 must remain parallel at all times, and in all conditions of lateral and rotational motion.

Drag Restraint: Similarly, in the flow-wise plane, the foil suspension bars 2 are constrained from any x-axis motion (i.e., swinging in a downstream direction due to the drag of the flowing water, or air, acting on the foil 1, the force vector of which varies according to the instantaneous pitch angle of the foil) by virtue of bars 2 passing through both upper piston 7B and lower piston 7A that are constrained to reciprocate laterally.

Centering and Supplementary Restoring Forces: Incorporated in the power and control modules 3A and 3B are internal springs 18C to partially or entirely provide the cyclic restoring forces required to sustain flutter, and to ensure that the pistons 7A and 7B remain centered in their respective cylinder 17A or 17B while at rest. It is to be understood that pneumatic or hydraulic energy absorbtion/return means can be used instead of springs 18C.

Figure 3:
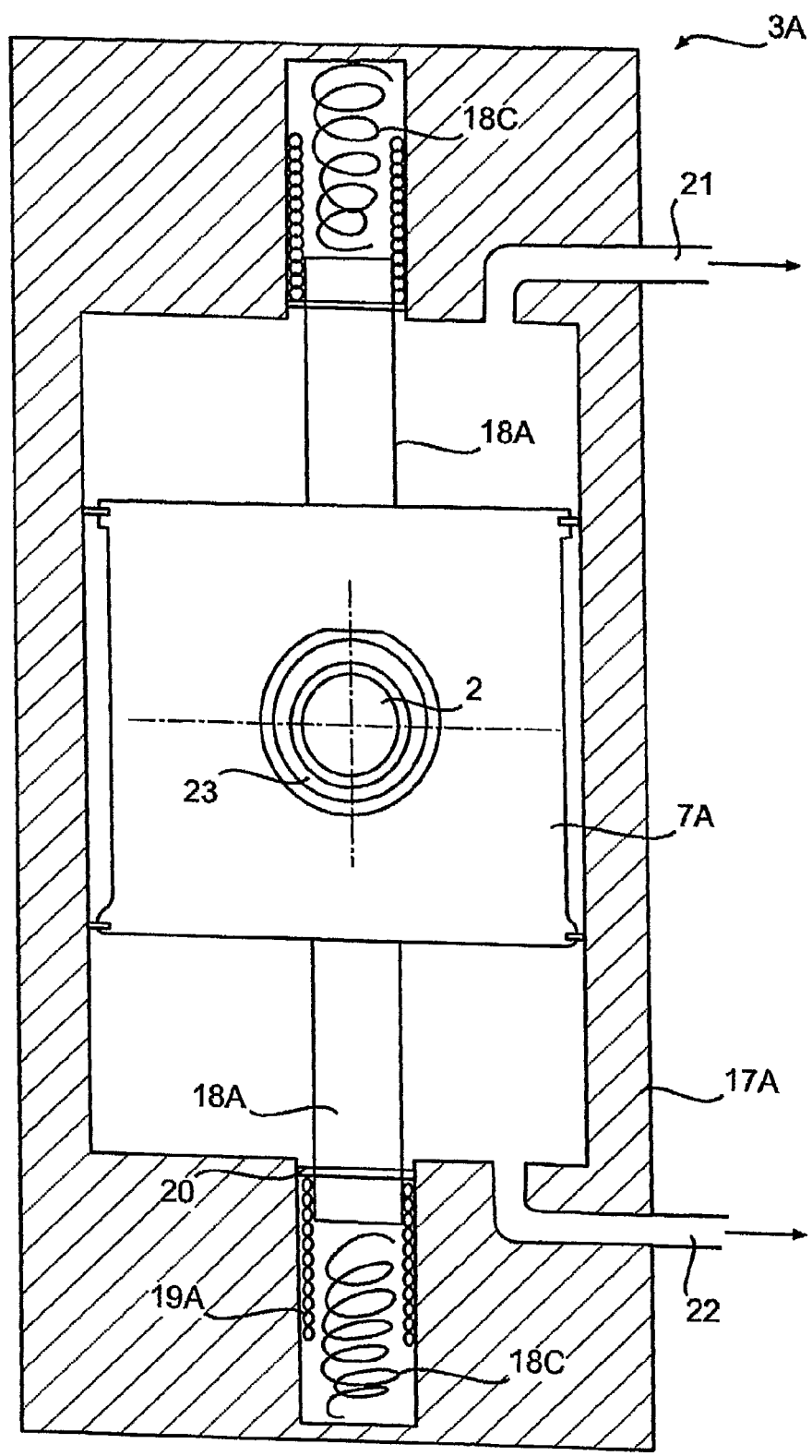
FIG. 3 is a plan view, partly in section, of a power module, showing the foil suspension bar 2 passing through a translational piston 7A moving within a cylinder 17A. External orifices 21 and 22 conduct the working fluid to and from the power module.

FIG. 3 is a plan view of a central cross-section of power module 3A. The translational motion of the piston 7A is identical to that of the piston 7B of control module 3B in each case the bidirectional free piston 7A and 7B moving translationally, guided in its lateral motion by their respective two piston support rods 18A and 18B carried by linear bearings 19A and 19B—except that instead of passing through a central rotational impeller and cylinder, the foil suspension bar 2 passes only through a sealed single or dual row ball bearing 23 set into the center of the piston 7A. The foil suspension bar 2 is therefore free to rotate about a vertical axis within the power module 3A, but any translational motion of the suspended foil 1 and its suspension bar 2 results in a corresponding lateral motion of the piston 7A. Such lateral piston motion causes a corresponding ejection or injection of working fluid through the external orifices 21 and 22. Any number of independent hydrofoil modules can be connected to six common fluid power transfer manifolds 24, 25, 26, 27, 39 and 40, running the length of the cascade, and terminating at the controller as shown in FIG. 5.

Figure 4:
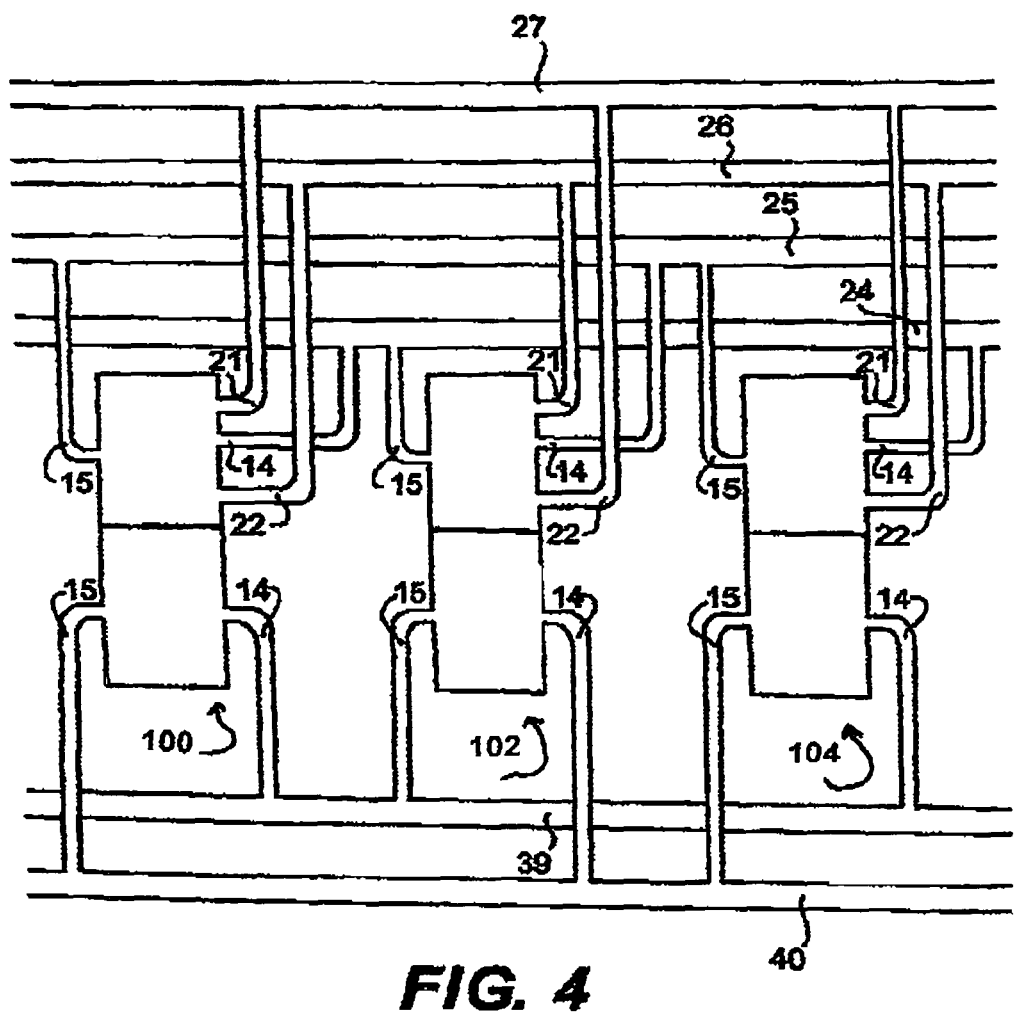
FIG. 4 is a schematic diagram of fluidic connections of a cascade of power/control modules to cascade-wide power and control manifolds.

FIG. 4 is a schematic diagram of fluidic connections of a cascade of any even number of power/control modules 3A and 3B of FIG. 1 up to six cascade-wide power and control manifolds. Only three of the successive and contiguous modules, 100, 102 and 104, are shown in FIG. 4, being sufficient to illustrate the respective interconnections of any number of foils. Because the external orifices on each module are completely stationary at all times, the manifolds and interconnections are all made of conventional stationary pressure tubing, joints and connectors. The external orifices 14 and 15 of the rotational elements of each control module are connected into the + rotational control manifold 24 and to the − rotational control manifold 25 such that the sense of the interconnected pairs of control modules alternates between successive contiguous modules. That is, orifices 14 of modules 100, and 104 connect into manifold 24, as well as orifice 15 of module 102, and so on, for all the foils in the cascade. Correspondingly, orifices 15 of Modules 100 and 104 connect into manifold 25, as well as orifice 14 of Module 102. These two rotational control manifolds 24 and 25 are effectively connected together at their termination at the pressurized hydraulic reservoirs shown in the controller shown in FIG. 5. Consequently, the alternate interconnection of the rotational elements of adjacent control modules causes all rotational motion of adjacent foils 1 to be locked together precisely in antiphase, exactly as if by mechanical linkage.

Correspondingly, the orifices 21 and 22 of all the modules are alternately connected into the z-axis translational control manifolds 26 and 27, so designated because the lateral motion of the foils 1 takes place along the Z axis, whereas the fluid (air or water) flowing into the cascade is defined as moving in the +X direction. All lateral motion of adjacent foils is, by the same explanation as for the rotational case above, therefore locked together in precise antiphase. Finally, the combined effect of the above rotational and translational control systems is such that any motion of all the foils 1 in a cascade is compelled to occur in exact antiphase at all times, as required by Dr. Arnold's flutter analysis, while at the same time the entire assembly of foils 1 is free to move rotationally and laterally, locked in antiphase, but not otherwise constrained. The resultant of any combination of the above rotational and lateral hydrofoil motions, appropriately controlled, can therefore replicate any motion or position called for in the Arnold flutter analysis, just as if the foils 1 were constrained by leading and trailing edge top and bottom mechanical linkages, interconnected levers and shafts, as described in the Arnold patents. The difference is that each foil 1 is now physically independent of all the other foils, with no mechanical attachments or connections between the ends of adjacent foils.

Figure 5:
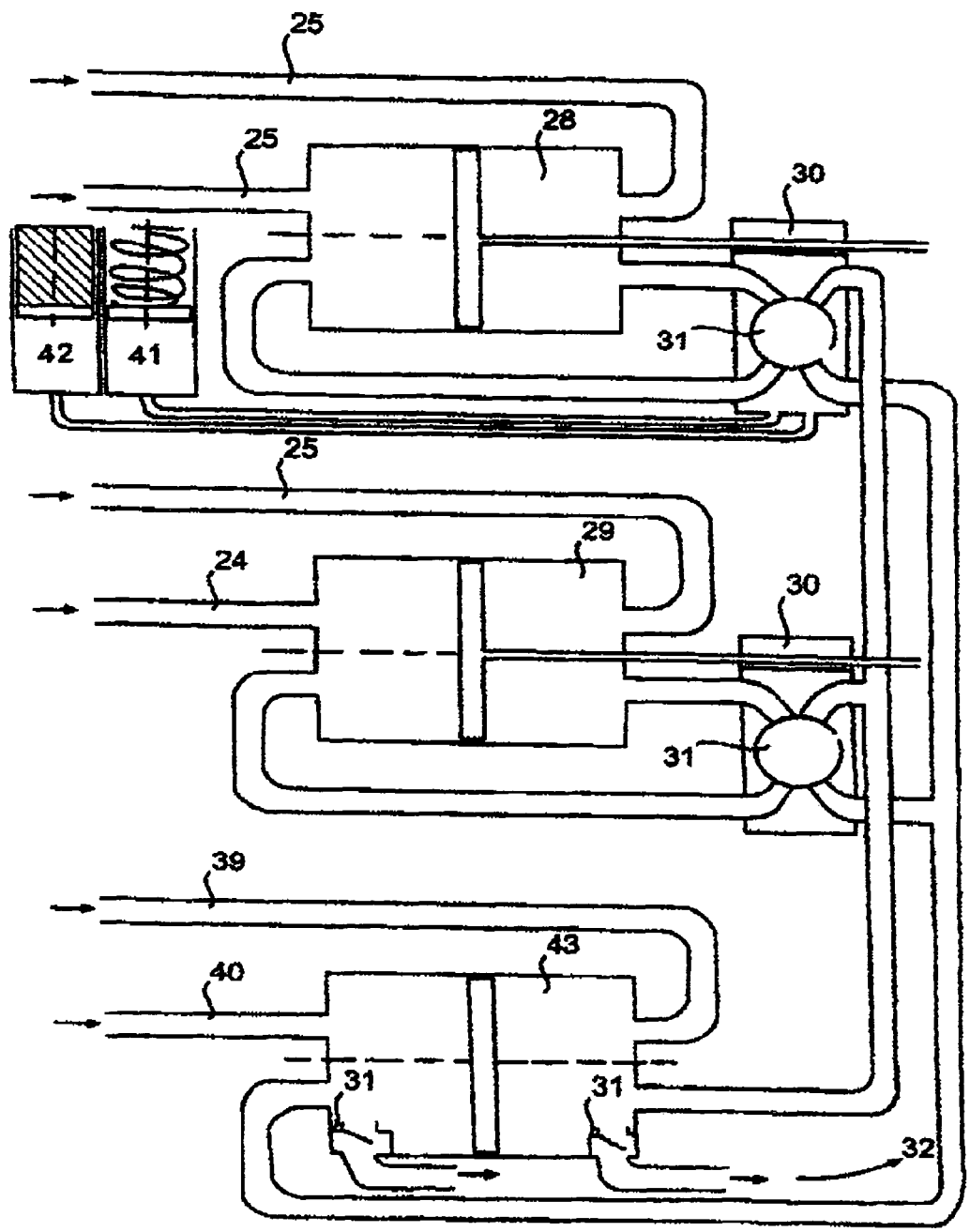
FIG. 5 is a schematic diagram of elements of a central fluidic power and control system for the cascade, showing the connection of the manifolds to translational and rotational control reservoirs 28 and 29, and to a power reservoir 43.

FIG. 5 is a schematic diagram of elements of one type of central fluidic power and control system for the cascade.

Antiphase lock: The system controller is illustrated here as two pressurized hydraulic reservoirs 28 and 29 containing double-acting pistons whose central positions correspond to the rest positions of the foils 1 (the foils being evenly spaced, and parallel to the flow direction). The same control functions can also be obtained by direct microprocessor programmable logic control of a set of dual proportional valves connecting each manifold proportionately to a fluid pressure reservoir or to a fluid return reservoir. A linear position/velocity sensor 30 on each piston rod provides translational and rotational foil position and motion feedback signals to the controller. A more comprehensive position and motion feedback system includes sensors located in each foil module, providing detail error information specific to any foil.

Restoring Force: To sustain flutter in a fluid flow, it is necessary to provide restoring forces effective while approaching and at the positions of extreme foil displacement, the precise forces varying throughout the operating cycle. A restoring force module 41 provides the necessary end-of-cycle restoring forces using one or a combination of either internal springs, a controllably compressible volume of air, or an electrical simulation of spring force. Additionally, partial restoring forces are provided by springs 18C plus air compression by the piston support rods 18A and 18B.

Inertial Mass: In addition to the above periodic restoring forces, to sustain flutter it is also necessary to provide a precise amount of additional inertial mass to the oscillating mass of the foils themselves. The inertial mass module 42 (FIG. 5) imposes a controllable additional mass on the foils 1 via the working fluid connection, controlling the amount of added inertial mass either by proportional control of the working fluid (hydraulic lever) coupled to a physical mass, or through electrical simulation of the identical forces.

Startup: A multipurpose electrically actuated variable-flow control valve 31 connected to the high pressure hydraulic accumulator 32 (FIG. 5) and to the hydraulic return manifold allows the external imposition (from the fluid power storage reservoir) of a preprogrammed initial rotation and translation pulse to the foils 1, to start up oscillations in flowing air or water.

Control and Optimization of Flutter: The application of differential restoring forces and supplementary inertial masses to the leading and trailing edges of the foils 1 is critical both to the initiation and to the maintenance of flutter. The foil rotational and lateral position feedback, the frequency, the instantaneous inflow water or air velocity and the external load and other information, provide the inputs to a programmable logic controller which, subject to a preprogrammed operating algorithm, controls the instantaneous addition of the necessary restoring forces and inertial mass to the foils 1.

It must be noted that flutter, once initiated, is a self-sustaining resonance phenomenon provided the appropriate conditions of input power (water or air flow), output load (damping), and differential restoring forces and masses, are all maintained. Such control adjustments are continuously and instantaneously made by the control system to compensate for ongoing changes of the above operating conditions.

Shutdown: By externally programming a forced return to the foil rest position, the entire cascade or a single foil can be shut down instantly for emergency or maintenance reasons. By introducing multichannel valves into the manifold-to-foil interconnections, individual foil modules can be disconnected and replaced without stopping the entire cascade.

Working Fluid Pressure Maintenance: A secondary working fluid loop pressure maintenance means is included in the control system but is not shown or detailed, being standard hydraulic design technology.

Figure 6:
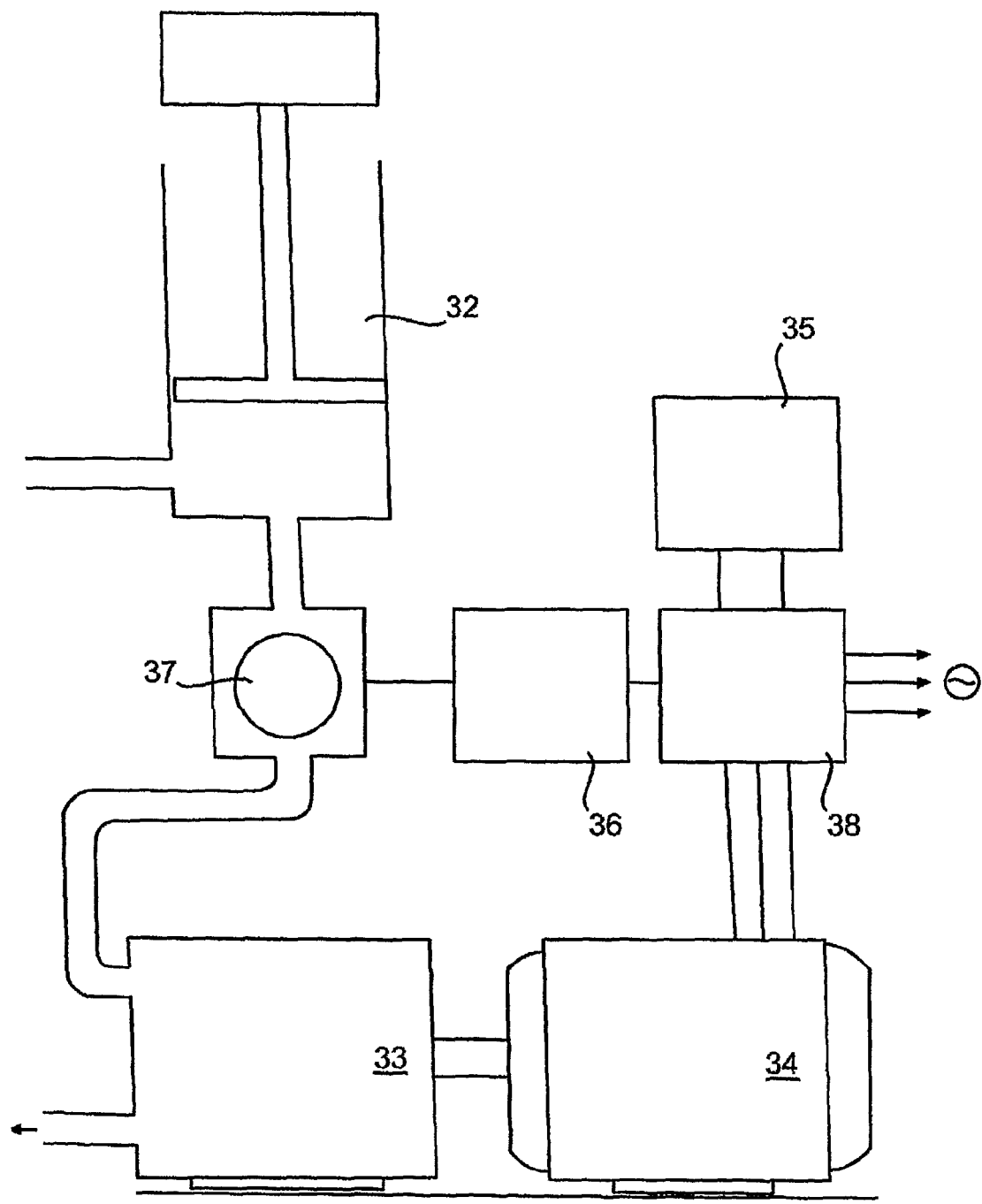
FIG. 6 is a schematic diagram of a power output means whereby working fluid from the power reservoir 43 is stored under pressure in an accumulator 32, and powers a fluidic motor 33 which drives a conventional alternator 34 to supply synchronized electrical power to a utility grid.

FIG. 6 is a schematic diagram of a representative utility-interconnected electrical power output means, describing one of a number of alternative means of delivering power from the cascade to an outside load.

Working fluid from the power reservoir 43 is stored under pressure in an accumulator 32, to then power a fluidic motor 33 which drives a conventional synchronous alternator 34 to supply frequency- and phase-synchronized electrical power to a utility grid. In this illustration, working fluid periodically displaced under pressure by the power modules 3A during controlled flutter, and delivered through the power manifolds 39 and 40, is injected via one-way valves into reservoir 43. A rotary hydraulic motor 33 is in turn driven by hydraulic pressure drawn from the accumulator 32 via a governed proportional flow supply valve 37.

The hydraulic motor 33 directly drives a conventional three phase brushless synchronous alternator which is interconnected, through appropriate solid-state switchgear 38 and suitable electrical protective mains, to a utility grid. Closure of the power output switching equipment is controlled by a synchroscope 35 such that the fully synchronized alternator 34 is connected to the grid as the alternator 34 and the grid pass through a zero-voltage point. The flow supply valve is governed by the alternator frequency and output current, once synchronization has occurred, to develop the maximum power output as determined by water or air flow conditions, generator capacity and temperature.

FIG. 7 is a perspective view of a single foil module, showing details of foil design to reduce vortex generation; (a) rounding of foil leading edge ends 61 is shown in FIGS. 7 and 7A, (b) addition of foillets 63 at foil trailing edge ends 65, (c) inclusion of deformable flexible boots 67 along at least a trailing edge are shown in FIGS. 7B and 7C along the leading and trailing edges, the degree of deformation governed by the instantaneous pitch angle (through the central controller). Longitudinal deformation of the flexible boot 67 is actuated by fluidic pressure delivered via the foil suspension bar 2. Directed into one of two appropriately shaped voids inside the boot 67, the fluidic pressure causes the tail of the boot to twist longitudinally from the central rest position respectively to the left or right of the flow axis. Accordingly, at large pitch angles, the edge of the foil 1 no longer presents the sharp edge (of the prior art) that generates a substantial downstream vortex stream. Only the trailing edge boot 67 is illustrated in FIGS. 7B and 7C, but the deformable boot can, in the same way, also be applied to the leading edge of the foil 1.

The thin, flat and smooth foillets 63, one at each end of the foil 1, as well as the faired corners as shown, also serve to minimize vortex generation, thereby reducing effective drag and increasing efficiency. Precise design of the shape of the foillet 63 is governed by aerodynamic analysis specific to the geometry of the foil.

Figure 8:
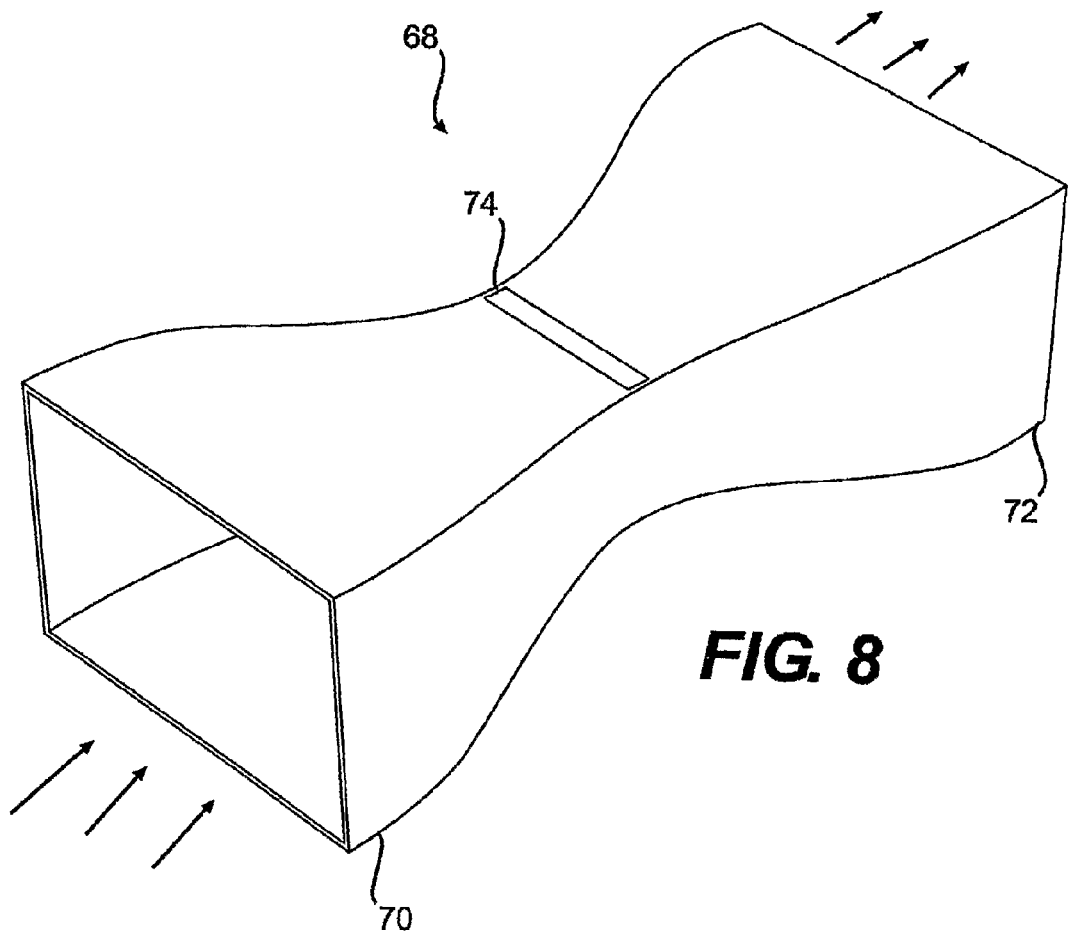
FIG. 8 is a perspective view of an oscillating cascade assembly with inflow and outflow ducts designed to modify fluid velocity and pressure for enhancing overall power transfer efficiency.
Figure 9:
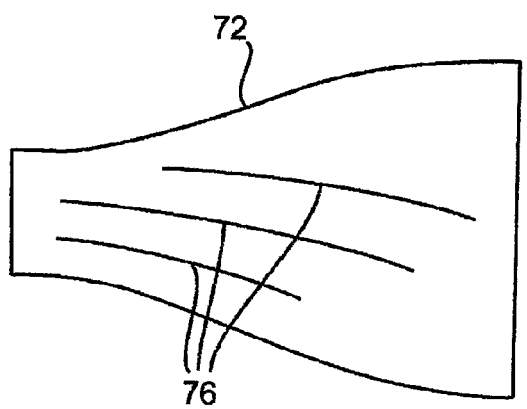
FIG. 9 is a schematic, vertical section, of the outflow duct of FIG. 8 showing a plurality of flow directors.

FIG. 8 is a perspective view of a complete oscillating cascade assembly, generally indicated by the numeral 68, provided with an inflow duct 70 and an outflow duct 72 designed to modify fluid velocity and pressure to enhance overall power transfer efficiency. The inflow duct 70 constitutes a means for causing passage of a fluid stream past the array of foils located at junction 74 whereby the foils are acted upon to undergo flutter oscillations. The profiles of the plan and elevation views of the ducts may differ, according to aerodynamic analysis specific to the characteristics and geometry of the cascade that is to be located at the junction 74 between the inflow and outflow ducts. Transverse flow directors 76 are shown in FIG. 9 inserted in, or formed with, the outflow duct 72 as a means of lowering net back pressure at the junction 74.

It is a key aspect of this invention that the design and function of the inflow and outflow channels or ducts form an integrated part of the design of the oscillating cascade and of the foils 1, for any specific case or application of the invention. A foil or foils equidistant from the opposite sides of a bounded fluid flow acts as an infinite cascade. While the cascade of foils described above and illustrated in FIG. 1 are positioned within a completely bounded enclosure illustrated in FIG. 8, it is also within the scope of this invention to utilize such a cascade or foil in an unbounded environment subject to Betz limits.

The core concepts illustrated herein as implemented using fluid power transfer means (hydraulics) can also be implemented by pneumatic or electrical means, or by a combination of fluid and electrical means.

A primary objective of these improvements is to eliminate all mechanism physically attached to ends of the foils for attaching adjacent foils together. Thus, each foil is self-standing and free of adjacent foils.

Having thus described the invention and its improvements with particular reference to the preferred forms thereof, it will be obvious to those skilled in the art to which the invention pertains, after understanding the invention, that various changes and modifications may be made therein without departing from the scope of the invention as defined by the claims appended hereto.

What is claimed is:

1. A method of converting the kinetic energy of a fluid stream into useful work, said method comprising the steps of:
    positioning a parallel array of foils within said fluid stream;
    mounting said foils for having at least two degrees of freedom, each foil being mounted by an individual suspension bar in cantilever mode;
    maintaining all of said suspension bars parallel to each other and;

allowing said stream of fluid to move through the array of foils for causing said foils to undergo flutter oscillations; and maintaining verticality and parallelism of said foils which is achieved by mounting means for providing rotational and translational motion while rigidly holding said foils vertical and parallel by a two-point suspension of each foil; wherein:

said foils are connected through said suspension bars to a hydraulic actuator through which the instantaneous positioning of said foils in translation and pitch is governed by an external controller for ensuring antiphase motion of adjacent foils, and transferring the energy output resulting from the foils oscillating in flutter to an accumulator.

2. A method as defined in claim 1 including the step of transferring motion of said foils for driving an hydraulic actuator for transferring energy from said foils to said accumulator.

3. A method as defined in claim 2 including the step of providing a fluidic conduit for transferring said energy from said hydraulic actuator to said accumulator.

4. A method as defined in claim 3 including the steps of converting said energy to electrical power.

5. A method as defined in claim 1 including the steps of controlling said array of foils by providing cyclical restoring forces and inertial mass for initiating and sustaining flutter of said foils.

6. A method as defined in claim 5 including the steps of enhancing fluid flow velocity in advance of passing through said array of foils, and reducing back pressure on said foils following passage of said fluid through said array of foils.

7. An apparatus comprising:
an array of foils positionable within a fluid stream;
means mounting said foils for accommodating at least two degrees of freedom;
means for allowing passage of said fluid stream past said array of foils whereby said foils undergo flutter oscillations;
a plurality of suspension bars, each said foil being mounted on an individual suspension bar in the form of a cantilever;
means for maintaining all of said suspension bars parallel to each other; and
mounting means for supporting individual foils for forming integrated, readily detachable and disconnectable modules, and wherein each module is removable and replaceable without stopping operation of an adjacent foil.

8. Apparatus as defined in claim 7 including a flexible boot attached to said foil and extending along a trailing edge thereof, said boot being adapted to receive into a void of said boot fluid from the individual suspension bar on which said foil is mounted to control deformation of said boot depending on a pitch angle of said foil.

9. An apparatus as defined in claim 7, wherein each said foil is separately cantilevered and having no direct connection with adjacent foils for minimizing drag and vortex generation.

10. Apparatus as defined in claim 7 wherein said foils include hydrodynamically shaped end portions at a leading edge to minimize vortex generation, foillet means formed at ends of said foils; and deformable, flexible boot means along at least a trailing edge adapted to receive into a void of said boot means fluid from the individual suspension bar on which said foil is mounted for altering curvature of said foil at different foil pitch angles.

11. An apparatus for converting the kinetic energy of a fluid stream into useful work, said apparatus comprising:
an array of foils positionable within a fluid stream;
means mounting said foils for accommodating at least two degrees of freedom;
means for allowing passage of said fluid stream past said array of foils whereby said foils undergo flutter oscillations;
a plurality of suspension bars, each said foil being mounted on an individual suspension bar in the form of a cantilever;
means for maintaining all of said suspension bars parallel to each other; and
an integrated multi-axis fluid actuator and pump module comprising a bidirectional pitch-controlling rotary actuator positioned within a bidirectional linear actuator and pump, such that movement of said foil or foils connected to said actuator and pump module by a respective one of said suspension bars provides for independent and simultaneous motion in both lateral and rotational axes.

12. A method of converting kinetic energy of a fluid stream into useful work, the method comprising:
positioning a parallel array of foils within the fluid stream, each foil of the array of foils being mounted at one end of the foil to a mechanical structure comprising a plurality of fluidic actuators that provide each foil with two degrees of freedom including translational motion and rotational motion, each of the translational and rotational motions being limited;
maintaining two adjacent foils in antiphase relative to each other within an oscillation cycle;
providing adjustable control forces to the array of foils wherein control forces are applied to a respective foil of the array of foils through a respective fluidic actuator coupled to the respective foil, the control forces being provided such that flutter oscillation of the foils is initiated and maintained; and
transferring energy output from the foils in oscillation to an accumulator.

13. The method of claim 12 wherein providing control forces comprises providing and restoring force.

14. The method of claim 12 wherein providing control forces comprises providing additional inertial mass.

15. The method of claim 12 wherein control forces are applied to control a pitch of respective foils.

16. The method of claim 12 wherein control forces are applied to the foils through a plurality of fluidic manifolds coupled to the fluidic actuator.

17. The method of claim 12 wherein the energy output by translational motion of the foils in oscillation is transferred from a respective fluidic actuator to the accumulator through a fluidic manifold.

18. An apparatus for converting kinetic energy of a fluid stream into useful work, the apparatus comprising:
a plurality of foils positionable within a fluid stream;
a plurality of fluidic actuator modules wherein a fluidic actuator module of the plurality of fluidic actuator modules is adapted for mounting a foil of the plurality of foils to the fluidic actuator at one end of the foil; and
a plurality of conduits adapted for fluidic coupling of the plurality of fluidic actuator modules to each other, to a control force source, and to an accumulator;
wherein the plurality of fluidic actuator modules are adapted to: allow rotational and translational movement of the foils; transfer control forces received through the plurality of conduits to the plurality of foils; and to transfer energy from motion of the foils through the plurality of conduits for transfer to the accumulator.

19. The apparatus of claim 18 wherein a fluidic actuator module of the plurality of fluidic actuator modules comprises a bidirectional rotary actuator positioned within a bidirectional translational actuator.

20. The apparatus of claim 18 further comprising:
a plurality of sensors adapted to sense linear and rotational position and velocity of each of the plurality of foils; and
a controller adapted to control the control force source in response to input from the plurality of sensors such that control forces provided by the control force source initiate and maintain flutter oscillation of the foils.

21. The apparatus of claim 20 wherein the apparatus is adapted to be arranged such that the controller is located external to the fluid stream.

22. The apparatus of claim 18 wherein a controller controls the control force source to maintain adjacent ones of the plurality of foils in antiphase with respect to each other during oscillation.

23. The apparatus of claim 18 wherein the control force source comprises a restoring force source and an inertial mass source.

* * * * *